May 13, 1930.  G. A. MEAD  1,757,972

METHOD OF MAKING RAIL JOINTS

Filed June 30, 1927

Witness:
H. J. Stromberger

Patented May 13, 1930

1,757,972

UNITED STATES PATENT OFFICE

GEORGE A. MEAD, OF MANSFIELD, OHIO, ASSIGNOR TO THE OHIO BRASS COMPANY, OF MANSFIELD, OHIO, A CORPORATION OF NEW JERSEY

METHOD OF MAKING RAIL JOINTS

Application filed June 30, 1927. Serial No. 202,722.

My invention relates to the electrical bonding of steel rails used as electric conductors in electric railway operation.

One of the objects of my invention is to provide an economical, simple and efficient means of electrically connecting the adjacent ends of rails and simultaneously provide therewith means for maintaining the ends of the rails in fixed and substantially immovable relation.

For many years the adjacent ends of rails used as electric conductors have been rigidly connected together as by means of pouring cast iron or cast steel about the adjacent ends to mechanically connect the ends and substantially make the rails an equivalent of a continuous rail, also this same effect has been brought about by welding the fish-plates or splice bars to the rail by both resistance welding and by seam welding.

In making joints of this nature it is frequently the case that the rails were connected electrically by means of flexible bonds, the ends of which were applied to the ends of the connected rail and adjacent thereto since full reliance is not always placed upon the welded joint as the only means of electrically connecting the rails. Sometimes this bond was applied to the rail and cast metal poured around the rail ends and the bond thereby embedding the bond in the cast joint; sometimes the bond is placed around the joint and where fish-plates are used it may be placed beneath the fish-plate with the ends projecting beyond the plate which makes a very long bond and quite expensive.

In my invention I cast to the side face, preferably the ball of the rail, the connecting lug of substantially pure copper.

In order to make such connection efficient it is necessary that the ends of the rail shall be substantially immovable, both from contraction and expansion of the rails and also vertical movement due to the passing of cars.

In the method and means of connecting the rails of my invention, I prefer to first place the ends of the rails in secure and permanent relation, and one means of bringing this about is disclosed herein and in the drawings attached hereto and forming a part of this specification.

In the drawing:—

Figures 7, 8:
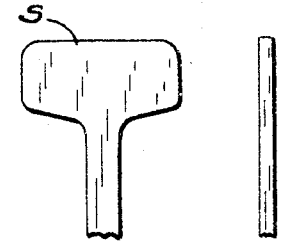
Figs. 7 and 8 are two views of a shim which I may employ between the end faces of the adjacent rails in order to prevent any spaces therebetween.

In the drawings I have shown the rails held in fixed relation by means of fish-plates secured thereto by fastening bolts and by seam welding, but it will be understood that the rails may be held in fixed relation, also by pouring cast steel about adjacent rail ends as is done in the well known thermite process or other well known processes now used. In preparing the rails for the application of the copper connecting lug I prefer to butt the end faces of the rails tightly together or if this is not done then I apply shims S as shown in Figs. 7 and 8 between the rail ends in order to fill any space therebetween and to place the rail ends, as it were, in compression. The shims can be applied after the plates have been placed in position and forced into place thereby filling the gap between the rails and placing the rails in compression. The shim may be made as shown in Fig. 7 or it may be of any other suitable shape which can be properly applied to the rail.

Figure 3:
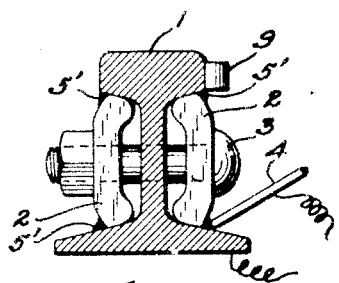
Fig. 3 is an end view of Fig. 1.
Figure 4:
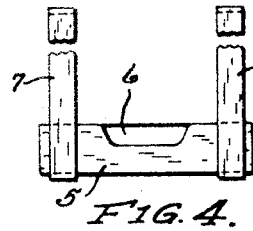
Figs. 4 and 5 show two views of a mold which I employ in applying molten copper to the adjacent ends of the rail.
Figure 5:

If the end faces of the rails 1 are butted together, I prefer to have them properly machined so as to make as perfect a fit as possible. The fish-plates 2 are then placed in position upon the opposite faces of the rails as shown in Fig. 3. In order to bring the ends of the rails into a compressed condition I have the centers of the bolt holes in the rails so positioned with respect to the centers of the holes in the fish-plates that it is necessary to force drift pins through the holes in order to bring the holes in the rails and fish-plates in proper alinement so that the fastening bolts 3 can be applied. This is brought about by spacing the centers of the bolt holes in the rails from the end of the rail slightly greater than the spacing of the centers of the bolt holes in the fish-plate from the center of the fish-plate or line corresponding to the butting end holes of the rails. By driving a taper wedge through one set of holes in each rail and plates it is possible to force the rails tightly together and place their contacting end faces in compression and permit the positioning of the bolts 3 in the other set of holes in each rail, this having been done, the bolts which have been applied are drawn up tightly. The drift pins may now be replaced by other bolts which are drawn up tightly in place thereby bringing the rails into compressive relation and the plates into fixed position. It is well to have the holes in the rails and plates finished to a size to just fit the bolts, then allowing no relative longitudinal movement. This having been done, I next seam weld the upper and lower edges of the plates and the rail as shown in Fig. 3, and this can be brought about by any of the well known methods of steel arc welding in which a carbon or steel electrode 4 is used and which is connected to a proper source of current supply. The adjacent edges of the plate and rail are shown as welded in Fig. 3 and indicated by the numeral 5', which shows deposit of steel which has been made from the electrode and which deposit is fused to the rail and plate, thus further securing the plates and the rail in addition to that of the fastening bolts 3.

Figure 1:
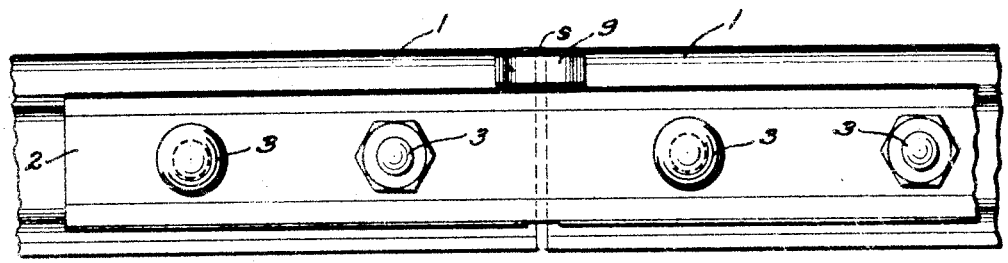
Fig. 1 is the side view of two positioned rails and with a shim between the rail ends.
Figure 2:
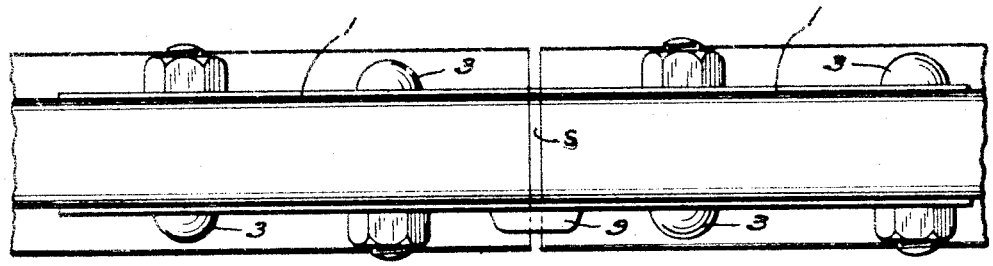
Fig. 2 is a top view of Fig. 1.
Figures 6, 10:
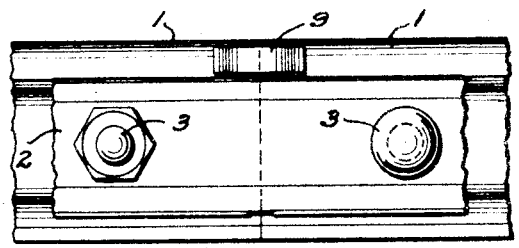
Fig. 6 shows the mold in position on the side face of the rail head and also the method of applying the molten copper.
Fig. 10 is similar to Fig. 1 with the end faces of the rails butted tightly together.

Having securely united the rails together with their end faces in compressive relation, as shown in Figs. 1 and 10, thereby avoiding relative movement of the rails longitudinally due to temperature changes and producing a substantially rigid joint against vertical movement I then proceed to electrically unite the adjacent ends of the rails by means of a cast copper lug and to do this I apply to the ends of the rails in overlapping relation thereto, a mold 5 formed preferably of carbon or carbon lined metal. This mold is provided with a casting cavity 6, also means 7 for securing the mold to the rails and is removed after the cast copper has cooled.

Having positioned the mold in place, I then proceed to fill the cavity 6 with molten copper preferably by means of the electric arc, although the oxy-acetylene flame or other gaseous flame may be employed. If the electric arc is used, which I prefer, it may be either that of the carbon arc or metallic arc and of the two I prefer the latter. In using the metallic arc, the electrode is of copper, preferably having incorporated therewith a fluxing or deoxidizing material which will react upon the copper to prevent oxidation and to dissolve such oxides as may tend to form, thereby producing a copper casting which is substantially free of oxides and blow holes and is dense and homogeneous. The fluxing material may comprise phosphorus, manganese, silicon, tungsten, vanadium, sodium, etc., a combination thereof, but my preferred material is silicon for the reason that it seems more easily manipulated and incorporated with the copper in the desired quantities and also because it does not reduce the electrical conductivity of the copper to the extent that the other reducing agents do. The reducing or de-oxidizing material may be applied in the form of a coating to the surface of the electrode.

The copper electrode 8, having incorporated therein the reducing agent, and the rail are connected to a source of electric power and an arc is struck within the cavity 6, between the metal electrode 8 and the mold or the rail and this arc tends to fuse the copper electrode and also the rail surface, but to a less extent, however, than when the electrode is of carbon. The molten copper is deposited in the cavity 6 and tends to remain in a fluid condition until the cavity is filled and unites thoroughly with the rail surface and form an alloy therewith. This alloying is assisted by the presence of the reducing agent which tends to dissolve all the oxide on the rail, providing the oxide is not burned therefrom, by the direct application of the arc.

I find that the fluxed copper can be made to unite with the rail if the rail is brought to a high degree of heat by bringing the arc into close proximity to the surface without, however, impinging on the same and the molten copper kept in a fluid condition. Under such conditions the oxide on the rail surface is dissolved by the fluxing agent and the molten copper forms with the rail surface an alloy or union which practically makes the two metals one at the joint or union.

If a carbon electrode is used then the electrode 8 becomes merely a rod of welding metal, the end of which is inserted in the arc between the carbon electrode and the mold and the same is deposited in a molten condition in the cavity 6. There are some advantages in the use of the carbon electrode over the metal electrode, in that the copper can be kept at a higher degree of fluidity than when the copper rod forms the electrode 8. In using the carbon electrode I prefer not to apply the arc to the rail at all as the carbon arc has a tendency to "bite into" or fuse the steel to a much greater extent than the arc formed with the copper electrode, and this is due to the fact that the melting point of the copper electrode is much lower than that of the steel.

Having filled the mold cavity 6 and the cast copper having solidified, the mold is removed, leaving the copper lug 9 securely welded to the adjacent surface of the rail ends and efficiently uniting the same electrically.

So long as the mechanical joint formed between the plates 2 and the rail maintain the rail in a sufficiently immovable relation the copper lug 9 will maintain the rails in an efficient electrically connected condition. The same is true where the rail ends are connected by being enclosed in a mass of steel which has been fused to the rail ends as by the Thermite process.

Figure 9:
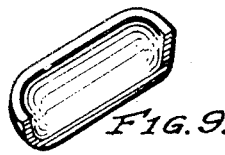
Fig. 9 is a metal receptacle.

In Fig. 9 is shown a member which, when applied to and bridging the ends of the rails, forms with the rail faces a receptacle to catch and retain the molten copper and I prefer to make the member of a ferrous metal, which is inexpensive and which the molten copper readily unites. This member is non-removable after the weld has been completed and becomes a part of the union, but is non-breakable, which is not the case with the carbon mold, and it tends to strengthen the copper lug mechanically.

There are, of course, variations to the construction of the joint and the method of making the same which will be apparent to those who are skilled in the art, but I wish to be limited only by my claims.

I claim:—

1. The method of electrically connecting adjacent rail ends comprising the steps of positioning plates on opposite sides of the rails bridging the ends, laying a seam of metal fused to the adjacent edges of the rails and plates to rigidly secure the rail ends together against relative and longitudinal movement, then applying to a face of the rail heads and overlapping the joint therebetween a mold forming a recess bridging the joint, then inserting within the recess an electrode connected to a source of power, then striking an arc between the electrode and the interior surface of the recess formed by the side surface of the rails and of the mold recess and fusing within said recess and to said side surfaces molten copper in the presence of a fluxing agent and in contact with the rail to form thereon a connecting lug.

2. The method of electrically connecting abutting rail ends comprising the steps of positioning plates upon opposite sides of the rail ends and bridging the same, then moving the end faces of the rails into tight engagement, then fusing the adjacent edges of the plates and rails together to form a rigid joint, then applying, to exposed faces of the rail and spanning the adjacent ends, a mold forming an open top recess, then inserting within the mold recess an electrode, then striking an arc and fusing therein fluxed copper in contact with the rail surfaces exposed within the recess and filling the mold recess with the fused copper to form upon the rail surfaces a connecting lug.

3. The method of electrically uniting adjacent rail ends, comprising the steps of positioning plates upon opposite sides of the rail ends in bridging relation thereto, then rigidly uniting the plates to the rails by depositing metal along the adjacent edge of the plates and rails and fused to the rails and plates, then applying to a side face of the rail ends a recessed receptacle to catch, support and retain molten copper in overlapping relation to the joint between the rails, and then inserting within the recess of the receptacle the end of an electrode and fusing within the recess molten copper to form therein a solid lug of cast copper fused to the side surface of the rail ends to electrically connect them.

4. The method of electrically connecting adjacent rail ends, comprising the steps of positioning plates on opposite sides of the rail ends in overlapping relation thereto to rigidly unite the rail ends together against transverse and longitudinal movement, then applying to a side face of the rails in bridging relation thereto a recessed receptacle, then depositing within the recess molten metal from a metallic electrode of copper fused to the rail ends to form a connecting lug thereto.

5. The method of electrically connecting adjacent rail ends comprising the steps of positioning the plates on opposite sides of the rail ends in bridging relation thereto and seam welding the plates to the rails to prevent relative longitudinal, lateral and vertical movement of the rails, then forming on a side surface of the rails a lug of cast copper in bridging relation to the rail ends.

6. The method of electrically connecting adjacent rail ends, comprising the steps of welding plates to the opposite sides of the rails in bridging relation to the ends to rigidly unite the rails together, then forming on the surface of the rails in fused and bridging relation to the side faces of the abutting rail ends a lug of metal having a higher electrical conductivity than that of the rails to electrically connect the rails.

7. The method of electrically connecting adjacent rail ends, comprising the steps of fusing the end faces of the rails into strong engagement and then welding plates to the opposite sides of the rail ends in bridging relation thereto, then forming on a surface of the rails in bridging relation to the abutting ends, a lug of cast copper.

8. The method of electrically connecting adjacent rail ends, comprising the steps of fusing a shim between the abutting end faces and then welding plates to the opposite sides of the rails in bridging relation thereto, then forming on a side surface of the rails in bridging relation to the abutting ends, a lug of cast copper fluxed with silicon.

9. The method of electrically connecting adjacent rail ends, comprising the steps of positioning the rail ends and rigidly uniting the same by welding plates thereto in bridging relation to the rail ends, then applying to the side face of the rail ends a receptacle forming a recess across the rail ends to connect, support and retain molten metal, then fusing the side surface of the rails with an electric arc and depositing simultaneously fused copper alloyed with the side faces of the rails.

10. The method of electrically and mechanically connecting rail ends, comprising positioning splicer bars on opposite sides of the rails and securing them to the rail by transverse means and placing the face of the rails into strong compression, seam welding along the adjacent longitudinal edges of the plates and rails to maintain the compression and prevent relative movement of the rails, then positioning a metal mold upon the side faces of the rails and forming a receptacle therewith bridging the rail ends, then fusing to the rail surfaces and surface of the mold within the receptacle, molten copper to electrically unite the rails and secure the metal mold in position.

11. The method of electrically connecting the ends of rails, comprising the steps of placing plates upon the opposite sides of the rails in bridging relation to the ends thereof, then seam welding the plates to the rails by fusing steel thereto, then placing upon a side surface of the heads of the adjacent rail ends a metal member forming with the rail surfaces a receptacle closed on all sides and the bottom and spanning the ends, then applying therein a heating flame to heat the parts and fusing copper therein in fused relation to the surfaces of the rails and the metal member to form a copper connection bridging the rail ends and having an alloy union with the rails and member.

12. The method of electrically and mechanically connecting rail ends comprising positioning splicer bars on opposite sides of the rails and securing them to the rail by transverse means and placing the end faces of the rails into strong compression, then seam welding along the adjacent longitudinal edges of the plates and rail to maintain the compression and prevent relative movement of the rails, then forming up a cast lug of copper and simultaneously fusing it to the side surface of the heads of the rails in bridging relation to the rail ends by means of a heating flame and molten copper applied to the rail surfaces in the recess of a receptacle.

In testimony whereof I affix my signature.

GEORGE A. MEAD.